(12) United States Patent
Nelson

(10) Patent No.: US 12,001,061 B2
(45) Date of Patent: *Jun. 4, 2024

(54) FIBER OPTIC ADAPTER WITH INTEGRALLY MOLDED FERRULE ALIGNMENT STRUCTURE

(71) Applicant: CommScope Technologies LLC, Hickory, NC (US)

(72) Inventor: Keith Quinten Nelson, Brooklyn Center, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/160,562

(22) Filed: Jan. 27, 2023

(65) Prior Publication Data
US 2023/0176293 A1 Jun. 8, 2023

Related U.S. Application Data

(63) Continuation of application No. 17/589,355, filed on Jan. 31, 2022, now Pat. No. 11,567,267, which is a
(Continued)

(51) Int. Cl.
*G02B 6/38* (2006.01)
(52) U.S. Cl.
CPC .......... *G02B 6/3825* (2013.01); *G02B 6/381* (2013.01); *G02B 6/3831* (2013.01);
(Continued)
(58) Field of Classification Search
CPC .... G02B 6/3825; G02B 6/381; G02B 6/3831; G02B 6/3833; G02B 6/3834;
(Continued)

(56) References Cited

U.S. PATENT DOCUMENTS 4,736,100 A 4/1988 Vastagh
4,747,020 A 5/1988 Brickley et al.
(Continued)

FOREIGN PATENT DOCUMENTS

CN 2426610 Y 4/2001
EP 0 597 501 A1 5/1994
(Continued)

OTHER PUBLICATIONS

International Search Report and Written Opinion dated Nov. 6, 2009.
(Continued)

*Primary Examiner* — Michelle R Connelly
(74) *Attorney, Agent, or Firm* — Merchant & Gould P.C.

(57) ABSTRACT

A fiber optic adapter is disclosed. The fiber optic adapter includes a main body configured to receive a first fiber optic connector through a first end and a second fiber optic connector through a second end for mating with the first fiber optic connector. The adapter includes a ferrule alignment structure located within an axial cavity of the main body, the ferrule alignment structure including a sleeve mount and a ferrule sleeve, the sleeve mount including an axial bore and at least one latching hook extending from a center portion of the sleeve mount toward the first end of the main body and at least one latching hook extending from the center portion toward the second end of the main body, the latching hooks configured to flex for releasably latching the first and second fiber optic connectors to the fiber optic adapter. The sleeve mount and the main body of the fiber optic adapter are unitarily molded as a single piece and the ferrule sleeve is separately placed within the axial bore of the sleeve mount.

27 Claims, 6 Drawing Sheets

Related U.S. Application Data continuation of application No. 17/038,241, filed on Sep. 30, 2020, now Pat. No. 11,262,507, which is a continuation of application No. 16/266,636, filed on Feb. 4, 2019, now Pat. No. 10,795,090, which is a continuation of application No. 15/710,989, filed on Sep. 21, 2017, now Pat. No. 10,197,741, which is a continuation of application No. 15/165,446, filed on May 26, 2016, now Pat. No. 9,778,422, which is a continuation of application No. 14/635,083, filed on Mar. 2, 2015, now Pat. No. 9,354,402, which is a continuation of application No. 14/499,594, filed on Sep. 29, 2014, now Pat. No. 8,992,095, which is a continuation of application No. 13/777,575, filed on Feb. 26, 2013, now Pat. No. 8,845,205, which is a continuation of application No. 12/548,121, filed on Aug. 26, 2009, now Pat. No. 8,382,382.

(60) Provisional application No. 61/092,166, filed on Aug. 27, 2008.

(52) U.S. Cl.
CPC ......... *G02B 6/3833* (2013.01); *G02B 6/3834* (2013.01); *G02B 6/3851* (2013.01); *G02B 6/3865* (2013.01); *G02B 6/3869* (2013.01); *G02B 6/3873* (2013.01); *G02B 6/3874* (2013.01)

(58) Field of Classification Search
CPC .. G02B 6/3851; G02B 6/3865; G02B 6/3869; G02B 6/3873; G02B 6/3874
See application file for complete search history.

(56) References Cited

U.S. PATENT DOCUMENTS

| | | |
|---|---|---|
| 4,792,203 A | 12/1988 | Nelson et al. |
| 4,824,196 A | 4/1989 | Bylander |
| 4,861,134 A | 8/1989 | Alameel et al. |
| 4,900,123 A | 2/1990 | Barlow et al. |
| 4,913,522 A | 4/1990 | Nolf et al. |
| 4,948,220 A | 8/1990 | Violo et al. |
| 4,995,688 A | 2/1991 | Anton et al. |
| 5,023,646 A | 6/1991 | Ishida et al. |
| 5,058,983 A | 10/1991 | Corke et al. |
| 5,067,783 A | 11/1991 | Lampert |
| 5,073,042 A | 12/1991 | Mulholland et al. |
| 5,076,688 A | 12/1991 | Bowen et al. |
| 5,142,598 A | 8/1992 | Tabone |
| 5,214,735 A | 5/1993 | Henneberger et al. |
| 5,233,674 A | 8/1993 | Vladic |
| 5,274,729 A | 12/1993 | King et al. |
| 5,274,731 A | 12/1993 | White |
| 5,317,663 A | 5/1994 | Beard et al. |
| 5,333,221 A | 7/1994 | Briggs et al. |
| 5,333,222 A | 7/1994 | Belenkiy et al. |
| 5,359,688 A | 10/1994 | Underwood |
| 5,363,465 A | 11/1994 | Korkowski et al. |
| 5,367,598 A | 11/1994 | Devenish, III et al. |
| 5,402,515 A | 3/1995 | Vidacovich et al. |
| 5,408,557 A | 4/1995 | Hsu |
| RE34,955 E | 5/1995 | Anton et al. |
| 5,420,958 A | 5/1995 | Henson et al. |
| 5,442,726 A | 8/1995 | Howard et al. |
| 5,448,015 A | 9/1995 | Jamet et al. |
| 5,469,526 A | 11/1995 | Rawlings |
| 5,497,444 A | 3/1996 | Wheeler |
| 5,506,922 A | 4/1996 | Grois et al. |
| 5,511,144 A | 4/1996 | Hawkins et al. |
| 5,542,015 A | 7/1996 | Hultermans |
| 5,647,043 A | 7/1997 | Anderson et al. |
| 5,708,751 A | 1/1998 | Mattei |
| 5,717,810 A | 2/1998 | Wheeler |
| 5,719,977 A | 2/1998 | Lampert et al. |
| 5,734,776 A | 3/1998 | Puetz |
| 5,737,464 A | 4/1998 | Underwood et al. |
| 5,764,834 A | 6/1998 | Hultermans |
| 5,764,844 A | 6/1998 | Mendes |
| 5,774,612 A | 6/1998 | Belenkiy et al. |
| 5,778,132 A | 7/1998 | Csipkes et al. |
| 5,784,515 A | 7/1998 | Tamaru et al. |
| 5,823,646 A | 10/1998 | Arizpe et al. |
| 5,825,955 A | 10/1998 | Ernst et al. |
| 5,838,855 A | 11/1998 | Stephenson |
| 5,883,995 A | 3/1999 | Lu |
| 5,887,095 A | 3/1999 | Nagase et al. |
| 5,909,526 A | 6/1999 | Roth et al. |
| 5,923,805 A | 7/1999 | Anderson et al. |
| 5,930,425 A | 7/1999 | Abel et al. |
| 5,945,633 A | 8/1999 | Ott et al. |
| 5,956,444 A | 9/1999 | Duda et al. |
| 5,969,294 A | 10/1999 | Eberle et al. |
| 5,975,769 A | 11/1999 | Larson et al. |
| 5,987,203 A | 11/1999 | Abel et al. |
| 5,993,071 A | 11/1999 | Hultermans |
| 6,027,252 A | 2/2000 | Erdman et al. |
| 6,041,155 A | 3/2000 | Anderson et al. |
| 6,044,193 A | 3/2000 | Szentesi et al. |
| 6,061,492 A | 5/2000 | Strause et al. |
| 6,069,797 A | 5/2000 | Widmayer et al. |
| 6,076,975 A | 6/2000 | Roth |
| 6,079,881 A | 6/2000 | Roth |
| 6,096,797 A | 8/2000 | Prantl et al. |
| 6,149,315 A | 11/2000 | Stephenson |
| 6,160,946 A | 12/2000 | Thompson et al. |
| 6,188,687 B1 | 2/2001 | Mussman et al. |
| 6,188,825 B1 | 2/2001 | Bandy et al. |
| 6,208,796 B1 | 3/2001 | Williams Vigliaturo |
| 6,227,717 B1 | 5/2001 | Ott et al. |
| 6,234,683 B1 | 5/2001 | Waldron et al. |
| 6,236,795 B1 | 5/2001 | Rodgers |
| 6,240,229 B1 | 5/2001 | Roth |
| 6,247,849 B1 | 6/2001 | Liu |
| 6,256,443 B1 | 7/2001 | Umno |
| 6,259,850 B1 | 7/2001 | Crosby, Jr. et al. |
| 6,271,484 B1 | 8/2001 | Tokutsu |
| 6,278,829 B1 | 8/2001 | BuAbbud et al. |
| RE37,489 E | 1/2002 | Anton et al. |
| 6,347,888 B1 | 2/2002 | Puetz |
| 6,356,697 B1 | 3/2002 | Braga et al. |
| 6,363,200 B1 | 3/2002 | Thompson et al. |
| 6,367,984 B1 | 4/2002 | Stephenson et al. |
| 6,385,381 B1 | 5/2002 | Janus et al. |
| 6,409,392 B1 | 6/2002 | Ampert et al. |
| 6,411,767 B1 | 6/2002 | Burrous et al. |
| 6,418,262 B1 | 7/2002 | Puetz et al. |
| 6,424,781 B1 | 7/2002 | Puetz et al. |
| 6,425,694 B1 | 7/2002 | Szilagyi et al. |
| 6,431,762 B1 | 8/2002 | Taira et al. |
| 6,434,313 B1 | 8/2002 | Clapp, Jr. et al. |
| 6,443,627 B1 | 9/2002 | Anderson et al. |
| 6,452,925 B1 | 9/2002 | Sistanizadeh et al. |
| 6,453,033 B1 | 9/2002 | Little et al. |
| 6,464,402 B1 | 10/2002 | Andrews et al. |
| D466,087 S | 11/2002 | Cuny et al. |
| 6,480,487 B1 | 11/2002 | Wegleitner et al. |
| 6,483,977 B2 | 11/2002 | Battey et al. |
| 6,496,640 B1 | 12/2002 | Harvey et al. |
| 6,504,988 B1 | 1/2003 | Trebesch et al. |
| 6,508,593 B1 | 1/2003 | Farnsworth et al. |
| 6,532,332 B2 | 3/2003 | Solheid et al. |
| 6,535,682 B1 | 3/2003 | Puetz et al. |
| 6,539,147 B1 | 3/2003 | Mahony |
| 6,539,160 B2 | 3/2003 | Battey et al. |
| 6,542,688 B1 | 4/2003 | Battey et al. |
| 6,554,485 B1 | 4/2003 | Beatty et al. |
| 6,556,763 B1 | 4/2003 | Puetz et al. |
| 6,577,595 B1 | 6/2003 | Counterman |
| 6,591,051 B2 | 7/2003 | Solheid et al. |
| 6,597,670 B1 | 7/2003 | Tweedy et al. |
| 6,614,980 B1 | 9/2003 | Mahony |

(56) References Cited

U.S. PATENT DOCUMENTS

| | | |
|---|---|---|
| 6,621,975 B2 | 9/2003 | Laporte et al. |
| 6,623,170 B2 | 9/2003 | Petrillo |
| 6,625,375 B1 | 9/2003 | Mahony |
| 6,631,237 B2 | 10/2003 | Knudsen et al. |
| RE38,311 E | 11/2003 | Wheeler |
| 6,654,536 B2 | 11/2003 | Battey et al. |
| 6,661,961 B1 | 12/2003 | Allen et al. |
| 6,668,127 B1 | 12/2003 | Mahony |
| 6,678,457 B2 | 1/2004 | Kim et al. |
| 6,712,523 B2 | 3/2004 | Zimmel |
| 6,755,574 B2 | 6/2004 | Fujiwara et al. |
| 6,760,530 B1 | 7/2004 | Mandry |
| 6,760,531 B1 | 7/2004 | Solheid et al. |
| 6,768,860 B2 | 7/2004 | Liberty |
| 6,778,752 B2 | 8/2004 | Laporte et al. |
| 6,788,786 B1 | 9/2004 | Kessler et al. |
| 6,792,190 B2 | 9/2004 | Xin |
| 6,792,191 B1 | 9/2004 | Clapp, Jr. et al. |
| 6,815,612 B2 | 11/2004 | Bloodworth et al. |
| 6,850,685 B2 | 2/2005 | Tinucci et al. |
| 6,853,795 B2 | 2/2005 | Dagley et al. |
| 6,870,734 B2 | 3/2005 | Mertesdorf et al. |
| 6,901,200 B2 | 5/2005 | Schray |
| 6,909,833 B2 | 6/2005 | Henschel et al. |
| 6,920,274 B2 | 7/2005 | Rapp et al. |
| 6,925,241 B2 | 8/2005 | Bohle et al. |
| 6,950,593 B2 | 9/2005 | Hodge et al. |
| 6,980,725 B1 | 12/2005 | Swieconek |
| 6,983,095 B2 | 1/2006 | Reagan et al. |
| 7,029,322 B2 | 4/2006 | Ernst et al. |
| 7,088,899 B2 | 8/2006 | Reagan et al. |
| 7,103,255 B2 | 9/2006 | Reagan et al. |
| 7,142,764 B2 | 11/2006 | Allen et al. |
| 7,146,089 B2 | 12/2006 | Reagan et al. |
| 7,171,102 B2 | 1/2007 | Reagan et al. |
| 7,198,409 B2 | 4/2007 | Smith et al. |
| 7,200,317 B2 | 4/2007 | Reagan et al. |
| 7,218,827 B2 | 5/2007 | Vongseng et al. |
| 7,233,731 B2 | 6/2007 | Solheid et al. |
| 7,277,620 B2 | 10/2007 | Vongseng et al. |
| 7,369,741 B2 | 5/2008 | Reagan et al. |
| 7,376,323 B2 | 5/2008 | Zimmel |
| 7,377,697 B2 | 5/2008 | Kahle et al. |
| 7,400,813 B2 | 7/2008 | Zimmel |
| 7,400,816 B2 | 7/2008 | Reagan et al. |
| 7,407,330 B2 | 8/2008 | Smith et al. |
| 7,416,349 B2 | 8/2008 | Kramer |
| 7,457,503 B2 | 11/2008 | Solheid et al. |
| 7,471,869 B2 | 12/2008 | Reagan et al. |
| 7,515,805 B2 | 4/2009 | Vongseng et al. |
| 7,519,259 B2 | 4/2009 | Smith et al. |
| 7,583,883 B2 | 9/2009 | Kowalczyk et al. |
| 8,382,382 B2 * | 2/2013 | Nelson ............... G02B 6/381 385/59 |
| 8,845,205 B2 * | 9/2014 | Nelson ............... G02B 6/3825 385/59 |
| 8,992,095 B2 * | 3/2015 | Nelson ............... G02B 6/3831 385/59 |
| 9,354,402 B2 * | 5/2016 | Nelson ............... G02B 6/3831 |
| 9,778,422 B2 * | 10/2017 | Nelson ............... G02B 6/3873 |
| 10,197,741 B2 * | 2/2019 | Nelson ............... G02B 6/3865 |
| 10,795,090 B2 * | 10/2020 | Nelson ............... G02B 6/3834 |
| 11,262,507 B2 * | 3/2022 | Nelson ............... G02B 6/3834 |
| 11,567,267 B2 * | 1/2023 | Nelson ............... G02B 6/3833 |
| 2001/0001270 A1 | 5/2001 | Williams Vigliaturo |
| 2002/0034290 A1 | 3/2002 | Pershan |
| 2002/0176681 A1 | 11/2002 | Puetz et al. |
| 2002/0181893 A1 | 12/2002 | White et al. |
| 2003/0002812 A1 | 1/2003 | Lampert |
| 2003/0007767 A1 | 1/2003 | Douglas et al. |
| 2003/0095772 A1 | 5/2003 | Solheid et al. |
| 2003/0113086 A1 | 6/2003 | Jun et al. |
| 2003/0147597 A1 | 8/2003 | Duran |
| 2003/0156797 A1 | 8/2003 | Gheradini |
| 2003/0174996 A1 | 9/2003 | Henschel et al. |
| 2003/0207601 A1 | 11/2003 | Adachi |
| 2003/0223703 A1 | 12/2003 | Chen et al. |
| 2004/0074852 A1 | 4/2004 | Knudsen et al. |
| 2004/0126069 A1 | 7/2004 | Jong et al. |
| 2004/0165852 A1 | 8/2004 | Erwin et al. |
| 2004/0228598 A1 | 11/2004 | Allen et al. |
| 2004/0264873 A1 | 12/2004 | Smith et al. |
| 2005/0002633 A1 | 1/2005 | Solheid et al. |
| 2005/0074211 A1 | 4/2005 | Greub |
| 2005/0129379 A1 | 6/2005 | Reagan et al. |
| 2005/0163448 A1 | 7/2005 | Blackwell, Jr. et al. |
| 2006/0083475 A1 | 4/2006 | Gmbish et al. |
| 2006/0093274 A1 | 5/2006 | Kahle et al. |
| 2006/0093301 A1 | 5/2006 | Zimmel et al. |
| 2006/0115220 A1 | 6/2006 | Elkins, II et al. |
| 2006/0154529 A1 | 7/2006 | Erdman et al. |
| 2006/0204200 A1 | 9/2006 | Lampert et al. |
| 2008/0008436 A1 | 1/2008 | Reagan et al. |
| 2008/0013910 A1 | 1/2008 | Reagan et al. |
| 2008/0019644 A1 | 1/2008 | Smith et al. |
| 2008/0019655 A1 | 1/2008 | Vongseng et al. |
| 2008/0025684 A1 | 1/2008 | Vongseng et al. |
| 2008/0075411 A1 | 3/2008 | Solheid et al. |
| 2008/0317425 A1 | 12/2008 | Smith et al. |
| 2009/0074372 A1 | 3/2009 | Solheid et al. |
| 2009/0087157 A1 | 4/2009 | Smith et al. |
| 2009/0190896 A1 | 7/2009 | Smith et al. |
| 2009/0196565 A1 | 8/2009 | Vongseng et al. |
| 2009/0285541 A1 | 11/2009 | Kowalczyk et al. |
| 2010/0054668 A1 | 3/2010 | Nelson |
| 2010/0111484 A1 | 5/2010 | Allen |
| 2013/0177279 A1 | 7/2013 | Nelson |
| 2015/0013889 A1 | 1/2015 | Nelson |

FOREIGN PATENT DOCUMENTS

| | | |
|---|---|---|
| EP | 0 731 369 A2 | 9/1996 |
| EP | 0 743 701 A2 | 11/1996 |
| EP | 0 788 002 A1 | 8/1997 |
| EP | 0 871 047 A1 | 10/1998 |
| EP | 0 967 498 A1 | 12/1999 |
| EP | 0 975 180 A1 | 1/2000 |
| EP | 1 045 267 A1 | 10/2000 |
| EP | 1 486 808 A2 | 12/2004 |
| JP | 63-229409 | 9/1988 |
| JP | 2000-266963 | 9/2000 |
| JP | 2001-33658 | 2/2001 |
| JP | 2001-188134 | 7/2001 |
| JP | 1-144266 | 6/2002 |
| JP | 3307618 | 7/2002 |
| JP | 2005-345589 | 12/2005 |
| JP | 3761762 | 3/2006 |
| WO | 98/53347 | 11/1998 |
| WO | 99/27404 | 6/1999 |
| WO | 00/75706 A2 | 12/2000 |
| WO | 02/21182 A1 | 3/2002 |
| WO | 03/093883 A2 | 11/2003 |
| WO | 02/103429 A2 | 12/2003 |
| WO | 2004/032532 A2 | 4/2004 |

OTHER PUBLICATIONS

"Retainer Staright [sic] Removable SC," which shows a latch design, 2 pages (Jan. 17, 2006).

24 photos of LambdaUnite® Blank Card; "LambdaUnite® MultiService Switch (MSS)" brochure (2003); and "Lucent's LambdaUnite® Busts Out" official release (Jan. 29, 2002).

ADC Telecommunications, Inc., brochure titled Value-Added module System, © 2000 (29 pages).

ADC Telecommunications, Inc., brochure titled Value-Added module System: Optical Distribution Frame (OMJ:fM 600), © 2001 (11 pages).

ADC Telecommunications, Inc. 's 2nd Edition of Fiber Panel Products; front cover, Table of Contents, pp. 1-111, and back cover; revised Jul. 1996, Item No. 846.

ADC Telecommunications, Inc. 's Secure Fiber Entrance Terminal (SFET) Brochure; front cover, pp. 2-7, and,t back cover; revised May 1998, Item No. 1005.

(56) References Cited

OTHER PUBLICATIONS

ADC Telecommunications, Inc.'s 6th Edition of Next Generation Frame (NGF) Product Family Ordering Guide; front cover, Table of Contents, pp. 1-41, and back cover; revised Feb. 2003, Item No. 820.

ADC Telecommunications, Inc.'s Fiber Optic, Cable Assemblies and Accessories Brochure; front cover, Table of Contents, pp. 1-23, and back cover; revised Apr. 2003, Item No. 100300.

ADC Telecommunications, Inc.'s OMX1M600, Optical Distribution Frame Brochure; front cover, Table of Contents, pp. 1-14, and back cover; revised Feb. 2001, Item No. 854.

ADC Telecommunications, Inc.'s Outside Plant, Fiber Cross-Connect Solutions Products Brochure; front cover, Table of Contents, pp. 1-48, and back cover.; revised Jun. 2002, Item No. 1047.

AMP Inc. catalog entitled "Fiber Optic Products," front and back covers and p. 59, (4 pgs.) (© 1991).

AT&T Network Systems catalog entitled "Fiber Optic Products Innovation for wide ranging applications," front and back covers and pp. 6-1 tlrrough 6-16 (18 pages) (© 1995).

ATI Optique Catalog, ATI Optique Division of TI electronique, Version 2.6, released Mar. 27, 2002 (50 pages).

Brochure from Amphenol Corp. entitled "Amphenol® 954 Series one piece SC Connector," 2 pgs. (1990).

Couplers: Couplers WDMS Packaging, Alcoa Fujikura Ltd., Telecommunications Division, © 2000 (5 pages) showing AFL splitters.

Drawings showing an ADC fiber storage trough concept including presentation entitled "Fujitsu Fiber Management Project Fiber Trough Concept", 11 pages (Jun. 2002).

Drawings showing another ADC fiber storage trough concept including presentation entitled "Fujitsu Fiber Management Project Fiber Trough Concept" by Kathy Barnes (7 pages), photos of trough disclosed in presentation by Kathy Barnes installed in a rack (3 pages) and presentation entitled "Fujitsu Fiber Management Project Fiber Trough Concept" by Dan Mertesdorf (9 pages), 19 total pages (Apr. 2002).

FONS Corporation's Modular Distribution Cabinets Rack Mount Enclosures, Model MDC-7, product sheet, 2 pages (2005).

HRS catalog entitled "Optical Fibre Connectors," front and back covers and pp. 16, 17 and 49 (5 pages) (Mar. 1991).

Wano, S. et al., "MU-type Optical Fiber Connector System," NTT Review, vol. 9, No. 2, pp. 63-71 (Mar. 1997).

Nexans, Cross-Connect Cabinet III: Plastic Watertight Cabinet for FTTH Applications, dated 2002 (2 pages).

Nexans, Cross-Connect Cabinet V: Metallic Watertight Cabinet for FTTH Applications, dated 2002 (2 pages).

NTT Int'l Fiber Termination Module (FTM) & Premises Optical Distribution Cabinets (PODC) product brochure, 3 pages, undated.

Optical fiber coupler review, Technical Report 2001, showing Sumitomo Osaka Cement Co. Ltd's Optical 1, Coupler (pp. 41-42).

Sugita, E. et al., "SC-Type Single-Mode Optical Fiber Connectors," Journal of Lightwave Technology, vol. 7, No. 11, pp. 1689-1696 (Nov. 1989).

\* cited by examiner

FIBER OPTIC ADAPTER WITH INTEGRALLY MOLDED FERRULE ALIGNMENT STRUCTURE

CROSS REFERENCE TO RELATED APPLICATIONS

This application is a continuation of application Ser. No. 17/589,355, filed Jan. 31, 2022, now U.S. Pat. No. 11,567,267; which is a continuation of application Ser. No. 17/038,241, filed Sep. 30, 2020, now U.S. Pat. No. 11,262,507; which is a continuation of application Ser. No. 16/266,636, filed Feb. 4, 2019, now U.S. Pat. No. 10,795,090; which is a continuation of application Ser. No. 15/710,989, filed Sep. 21, 2017, now U.S. Pat. No. 10,197,741; which is a continuation of application Ser. No. 15/165,446, filed May 26, 2016, now U.S. Pat. No. 9,778,422; which is a continuation of application Ser. No. 14/635,083, filed Mar. 2, 2015, now U.S. Pat. No. 9,354,402; which is a continuation of application Ser. No. 14/499,594, filed Sep. 29, 2014, now U.S. Pat. No. 8,992,095; which is a continuation of application Ser. No. 13/777,575, filed Feb. 26, 2013, now U.S. Pat. No. 8,845,205; which is a continuation of application Ser. No. 12/548,121, filed Aug. 26, 2009, now U.S. Pat. No. 8,382,382; which application claims the benefit of provisional application Ser. No. 61/092,166, filed Aug. 27, 2008, which applications are incorporated herein by reference in their entirety.

FIELD

The present disclosure relates generally to fiber optic adapters. In particular, the present disclosure relates to fiber optic adapters having bodies with integrally molded ferrule alignment features.

BACKGROUND

Fiber optics have revolutionized communication throughout the world. Fiber optics are generally thin strings of glass designed to carry light which can be grouped together. With the increased use of fiber optics, it has become increasingly important to be able to connect and disconnect fiber optic cables from various sources. Two fiber optic cables can be optically coupled so that they are in communication with one another by using well-known connectors and adapters, thereby putting each fiber optic cable in communication with the other. The connectors are terminated to the end of each cable and then plugged into the adapters. The adapters normally include an opening at each end designed to receive the connectors. An example adapter for holding two SC-type mating connectors is described in U.S. Pat. No. 5,317,663. Improvements in the design and manufacture of fiber optic adapters are desirable.

SUMMARY

The present disclosure relates generally to fiber optic adapters configured to receive fiber optic connectors having ferrules, wherein the ferrule alignment structures of the adapters are integrally molded as a unitary piece with the adapter body.

In one particular aspect, the present disclosure relates to a fiber optic adapter including a main body configured to receive a first fiber optic connector through a first end and a second fiber optic connector through a second end for mating with the first fiber optic connector, the adapter including a ferrule alignment structure located within an axial cavity of the main body, the ferrule alignment structure including a sleeve mount and a ferrule sleeve, the sleeve mount including an axial bore and at least one latching hook extending from a center portion of the sleeve mount toward the first end of the main body and at least one latching hook extending from the center portion toward the second end of the main body, the latching hooks configured to flex for releasably latching the first and second fiber optic connectors to the fiber optic adapter, wherein the sleeve mount and the main body of the fiber optic adapter are unitarily molded as a single piece and the ferrule sleeve is separately placed within the axial bore of the sleeve mount, the ferrule sleeve configured to receive and align ferrules of the first and second fiber optic connectors.

A variety of additional inventive aspects will be set forth in the description that follows. The inventive aspects can relate to individual features and combinations of features. It is to be understood that both the foregoing general description and the following detailed description are exemplary and explanatory only and are not restrictive of the broad inventive concepts upon which the embodiments disclosed herein are based.

DETAILED DESCRIPTION

Figure 1:
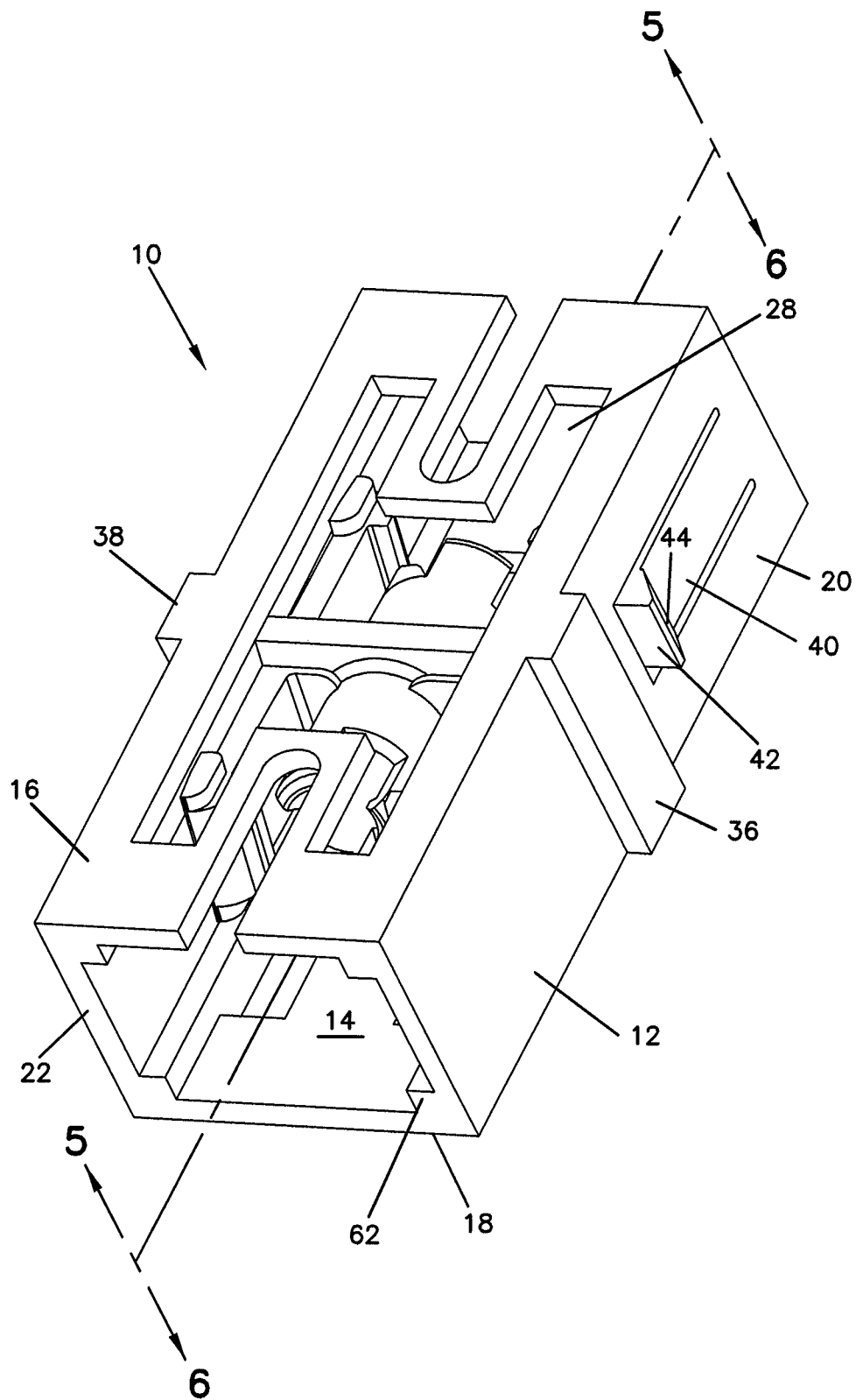
FIG. 1 is a perspective view of a fiber optic adapter having features that are examples of inventive aspects in accordance with the principles of the present disclosure, the fiber optic adapter shown without the top and bottom cover panels thereof.

Reference will now be made in detail to examples of inventive aspects of the present disclosure which are illustrated in the accompanying drawings. Wherever possible, the same reference numbers will be used throughout the drawings to refer to the same or like parts.

Referring to FIGS. 1-6, a fiber optic adapter 10 having features that are examples of inventive aspects in accordance with the principles of the present disclosure is shown. In the depicted embodiment, the fiber optic adapter 10 is configured to intermate SC-type connectors, one of which is shown in FIG. 7 of the present application and also shown and described in U.S. Pat. Nos. 5,317,663 and 6,712,523, the entire disclosures of which are incorporated herein by reference. However, it should be noted that the SC-type fiber optic adapter 10 described herein represents only one example embodiment of the inventive features of the disclosure and that the inventive features may be applicable to adapters configured to be used with other types of connectors (e.g., LC, LX.5, etc.). The inventive features should not be limited only to the specific embodiments described and illustrated herein.

Still referring to FIGS. 1-6, the fiber optic adapter 10 includes a main body 12 including an axial cavity 14 that is defined by a top side-wall 16, a bottom side-wall 18, a right side-wall 20, and a left side-wall 22. The axial cavity 14 of the main body 12 extends between a first opening 24 and a second opening 26. Each opening 24, 26 is sized to receive a fiber optic connector 100.

Since the embodiment of the adapter described herein is configured for use with SC-type connectors, the main body 12 and the axial cavity 14 are specifically sized and configured to accommodate SC-type connectors.

Figure 1A:
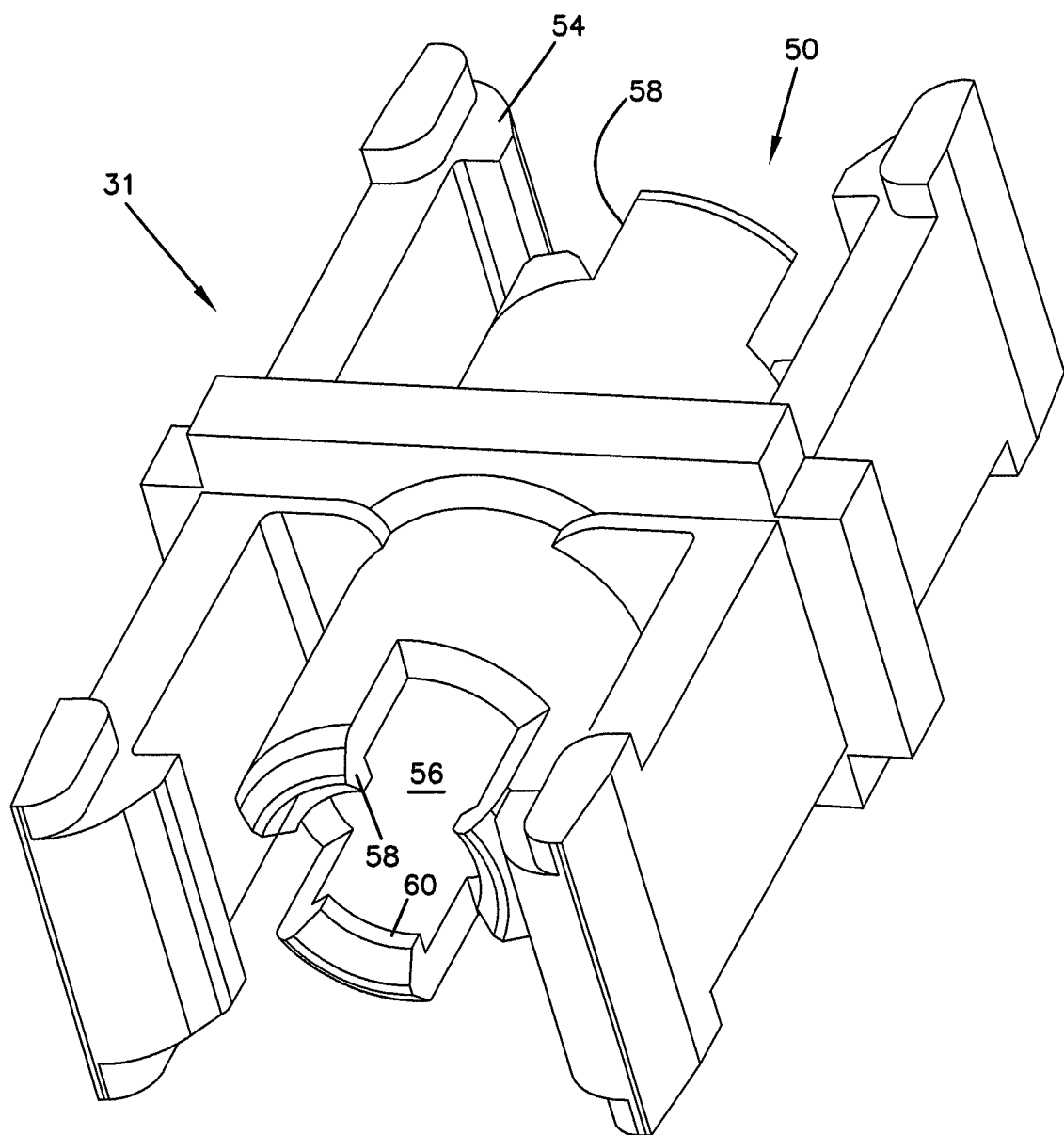
FIG. 1A illustrates the internal ferrule alignment features of the fiber optic adapter of FIG. 1 separately from the main body of the fiber optic adapter.
Figure 2:
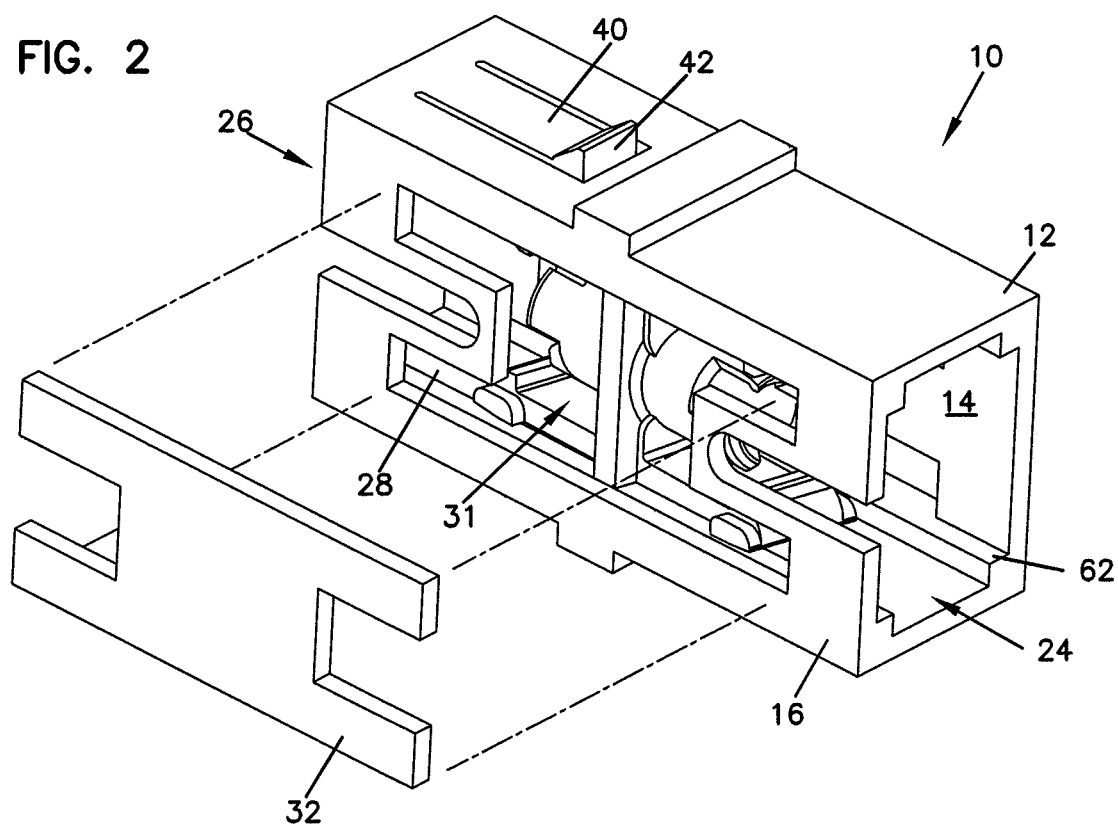
FIG. 2 illustrates the fiber optic adapter of FIG. 1 with one of the cover panels exploded from the body of the fiber optic adapter.
Figure 3:
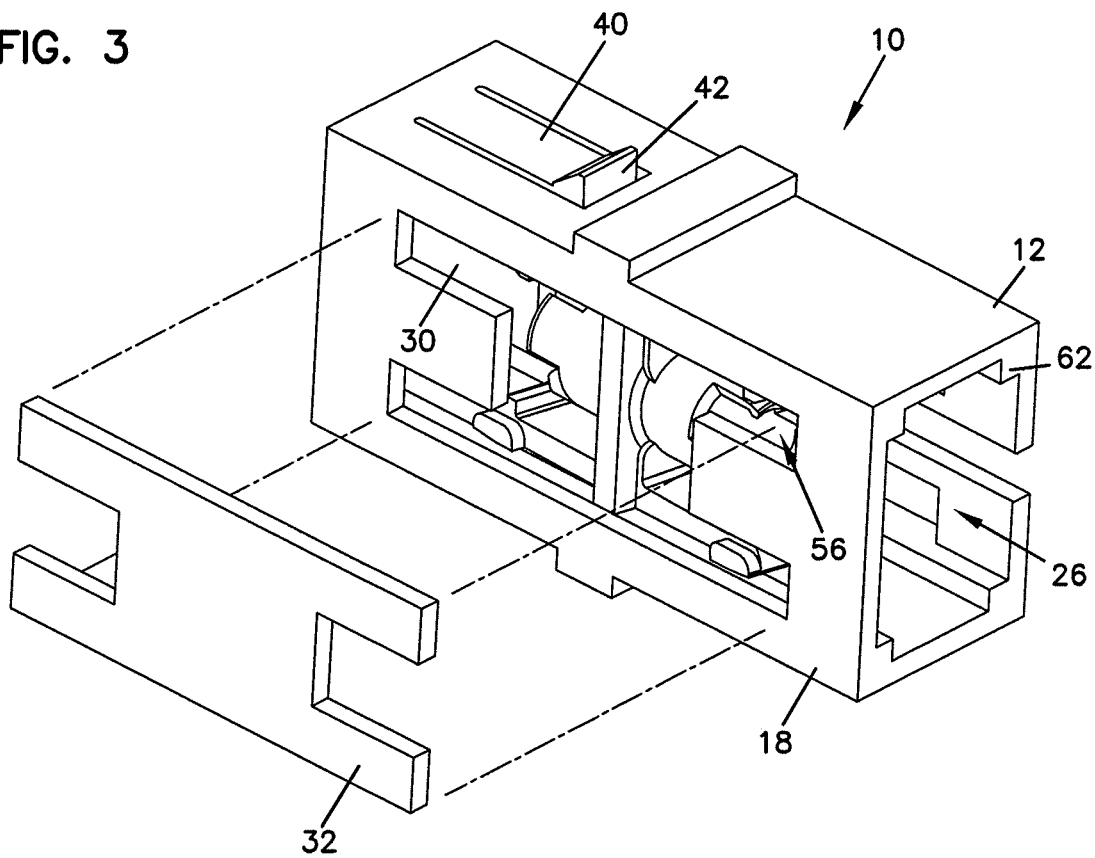
FIG. 3 illustrates the fiber optic adapter of FIG. 2 with the opposing cover panel exploded from the body of the fiber optic adapter.

Referring now to FIGS. 1-3, the main body 12 of the fiber optic adapter 10 includes a first opening 28 at the top side and a second opening 30 at the bottom side thereof. As will be discussed in further detail below, the first and second openings 28, 30 allow the fiber optic adapter main body 12 and at least a portion of the internal ferrule alignment structures 31 (see FIG. 1A) that are located within the main body 12 to be injection-molded as a unitary piece. The first and second openings 28, 30 are covered by a pair of cover panels 32 after the fiber optic adapter 10 has been unitarily molded. The cover panels 32 may be ultrasonically welded to the main body 12 of the adapter 10.

Preferably, the first opening 28 and the second opening 30 are of the same configuration such that the cover panels 32 used for the first opening 28 and the second opening 30 are also of the same size and shape. In this manner, the cover panels 32 for both the top and the bottom sides of the adapter 10 can be produced using the same mold/tool, reducing manufacturing costs.

Still referring to FIGS. 1-3, located in the bottom side-wall 18 is a keyway 34 sized and shaped to receive a corresponding key 102 of an SC-type fiber optic connector 100 shown in FIG. 7 and discussed below.

Located on the exterior of the main body 12 are tabs 36, 38. Tab 36 is located on right side-wall 20 and tab 38 is located on left side-wall 22. The tabs 36, 38 are operative in supporting the adapter 10 on or against a planar surface such as that of a bulkhead. The main body 12 also includes a flexible cantilever arm 40 on each of the right side-wall 20 and left side-wall 22. The flexible cantilever arms 40 define outwardly protruding tabs 42 that are configured to cooperate with the tabs 36, 38 to capture the fiber optic adapter 10 against a bulkhead. The tabs 42 of the cantilever arms 40 include ramped surfaces 44 to facilitate insertion of the fiber optic adapter 10 into an aperture defined by the bulkhead structure. The ramped surfaces 44 cause the flexible cantilever arms 40 to flex inwardly as the adapter 10 is moved passed the aperture of the bulkhead.

Although in the preferred embodiment the adapter 10 includes integrally molded flexible cantilever arms 40, if desired, in other alternative embodiments, other types of fasteners such as a flexible clip shown and described in U.S. Pat. No. 5,317,663 may be used. Recesses may be provided on the main body 12 and the cover panels 32 to permit the use of alternative fastener means such as the flexible clip.

Also, in other embodiments of the adapter, the tabs may be longer and include fastener openings. As such, screws or similar fasteners may be used to connect the fiber optic adapter to a bulkhead structure.

The attachment structures discussed herein are non-limiting examples and other removable or non-removable fastening structures such as snap fasteners, rivets, etc. may be used to attach adapter to a bulkhead structure.

Figure 5:
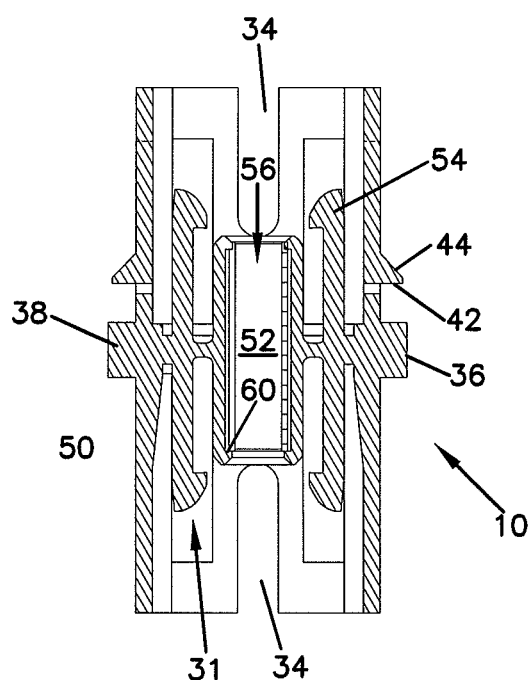
FIG. 5 is a cross-sectional view of the fiber optic adapter taken along line 5-5 of FIG. 1.
Figure 6:
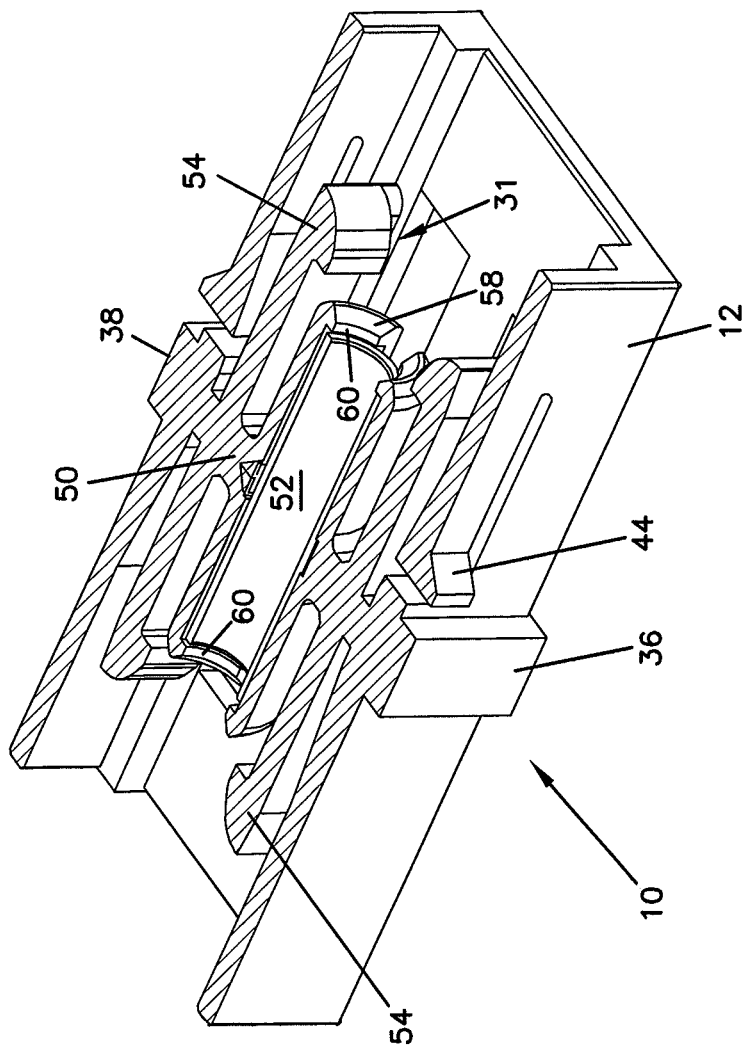
FIG. 6 is a cross-sectional view of the fiber optic adapter taken along line 6-6 of FIG. 1.
Figure 7:
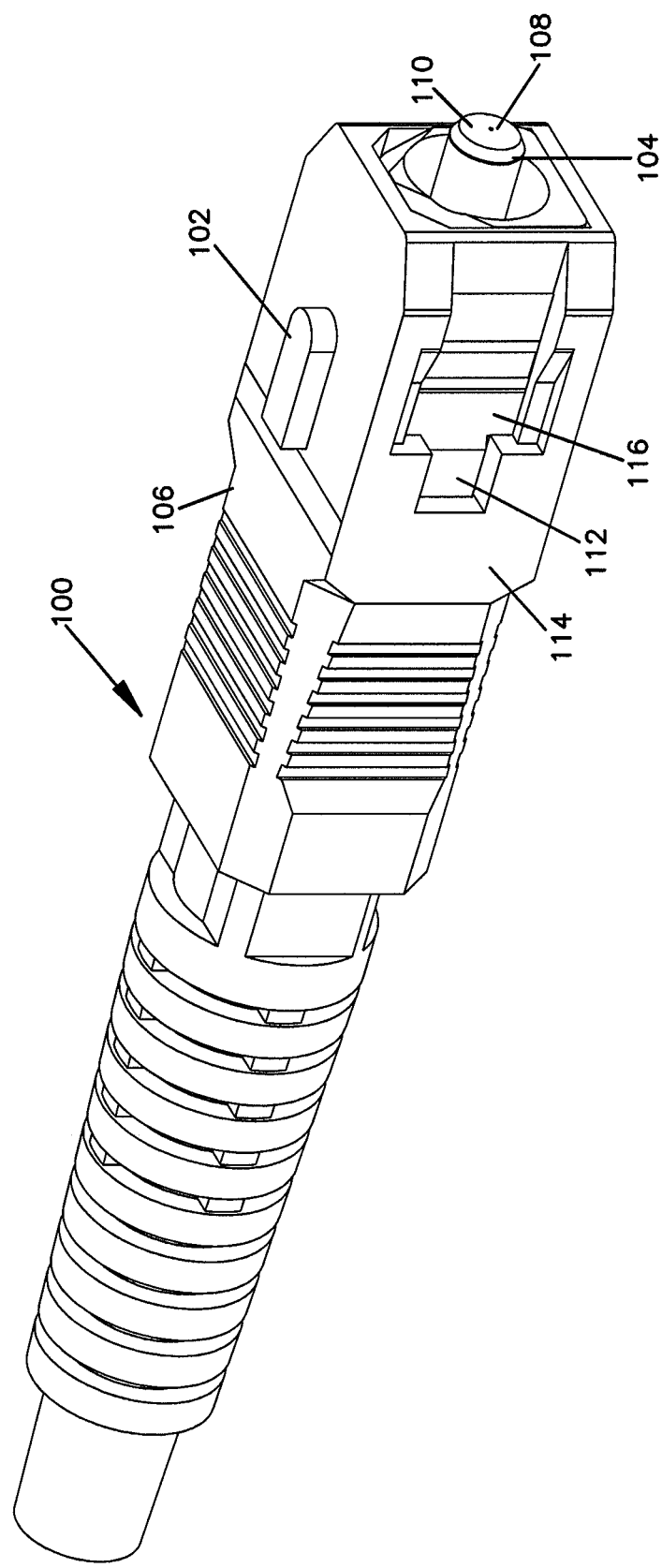
FIG. 7 is a perspective view of an example fiber optic connector for use with the fiber optic adapter of FIGS. 1-6.

Now referring to FIGS. 5 and 6, as discussed above, the fiber optic adapter main body 12 and at least a portion of the internal ferrule alignment features 31 of the adapter 10 are injection-molded as a unitary piece, and cover panels 32 are used to cover the first and second openings 28, 30 after the adapter 10 has been molded. In FIGS. 5 and 6, the internal ferrule alignment components 31 of the SC-type adapter 10 are shown via cross-sectional views. Also, although the internal ferrule alignment features 31 are molded integrally with the main body 12 of the fiber optic adapter 10, FIG. 1A illustrates the internal ferrule alignment features of the fiber optic adapter of FIG. 1 separately from the main body of the fiber optic adapter for ease of description and clarity.

The internal ferrule alignment structures 31 include a sleeve mount 50 and a ferrule sleeve 52 that is designed to be inserted within the sleeve mount 50. As shown in FIGS. 5 and 6, the sleeve mount 50 is molded integrally with the adapter body 12 and is configured to align the ferrules 104 of two SC-type fiber optic connectors 100 (FIG. 7) received from opposing ends of the adapter body 12 for interconnection.

The sleeve mount 50 includes latching hooks 54, an axial bore 56, and flexible arms 58 defined around the axial bore 56. Once the sleeve mount 50 is molded integrally with the main body 12 of the adapter 10, the ferrule sleeve 52 is received within the axial bore 56 of the sleeve mount 50. The flexible arms 58 flex out radially to receive the sleeve 52 with a snap fit arrangement. The flexible arms 58 include inwardly extending fingers 60 for capturing the sleeve 52 within the axial bore 56 once the sleeve 52 is received therein (see FIGS. 5 and 6). The sleeve 52 can be inserted into the axial bore 56 from either end of the sleeve mount 50. In certain embodiments, the sleeve 52 may also include a slit for allowing the sleeve 52 to compress, elastically reducing its diameter during insertion into the axial bore 56.

It should be noted that the flexible arms 58 located at one end of the sleeve mount 50 may be positioned at an offset relationship to the flexible arms 58 located at the other end of the sleeve mount 50. In this manner, the inwardly extending fingers 60 may be molded with molds/tools that are pulled apart from the ends of the fiber optic adapter in the longitudinal direction. During the molding process, the first and second openings 28, 30 (see FIGS. 2-3) allow certain features of the adapter 10 to be molded with molds/tools that are pulled apart in the transverse direction while features such as the inwardly extending fingers 60 are formed with molds/tools that pulled apart in the longitudinal direction of the fiber optic adapter 10.

Still referring to FIGS. 1A, 5 and 6, the latching hooks 54 are configured to cooperate with the housing 106 of an SC-type connector 100 and are used for releasably latching connectors 100 to the adapter 10, as will be described in further detail below.

Figure 4:
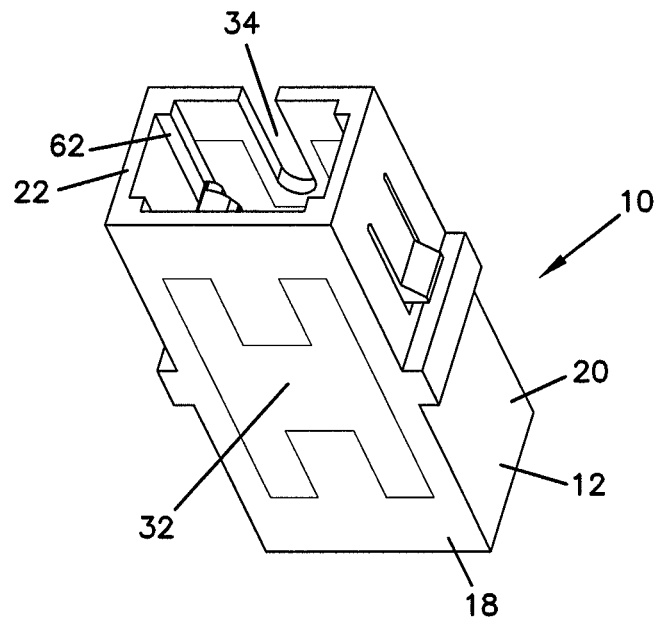
FIG. 4 is another perspective view of the fiber optic adapter of FIG. 1, with the cover panels mounted thereon.

Referring to FIGS. 4-6, located on the interior of main body 12 are ridges 62, extending longitudinally within the axial cavity 14 along the interior corners of the axial cavity 14. The ridges 62 cooperate with the outer surface of a fiber optic connector housing 106 to receive the connector 100 within the axial cavity 14. In certain embodiments, the ridges 62 may include ramped entry surfaces to facilitate insertion of the connector 100 within the adapter cavity 14.

The main body 12 of the adapter 10 and the sleeve mount 50 may be constructed of a polymer by an injection molding process. It is contemplated that other materials and other molding processes may be used for the construction of the fiber optic adapter 10.

FIG. 7 shows an SC-type fiber optic connector 100 that may be used with the fiber optic adapter 10 shown in FIG. 1-6. Connector 100 includes an optical fiber 108 which is held therein by a ferrule 104. The end of optical fiber is located on a contact face 110 of the ferrule 104. Ferrule 104 is held within a housing 106 of the connector 100. The housing 106 includes a first inner portion 112 and an axially slidable outer portion 114. The housing 106 defines two slots 116 on opposite sides thereof and a key 102 located on a side perpendicular to the sides containing the slots 116. As discussed previously, the key 102 is configured to engage the keyway 34 of fiber optic adapter main body 12 to properly position connector 100 through the first opening 28 of the adapter 10. When properly positioned within the axial cavity 14 of adapter 10, the ferrule 104 is received within the ferrule sleeve 52 inside the sleeve mount 50 of the adapter 10.

As is known in the art, when a first connector 100 is fully inserted into the adapter 10, the flexible latching hooks 54 of the sleeve mount 50 of the adapter engage the slots 116 in the outer portion 114 of the connector housing 106 to releasably hold connector 100 within the axial cavity 14 of adapter 10. When a second connector 100 is inserted into the opposing side of adapter 10, an optical connection is formed between the optical fiber of the first connector 100 and the optical fiber of the second connector 100 through the abutting contact faces 110 of the ferrules 114 within the ferrule sleeve 52.

When removing one of the fiber optic connectors 100, the slidable outer portion 114 of the connector housing 106 is slid axially relative to the first inner portion 112 of the connector housing 106 away from the opposing connector until the flexible latching hooks 54 of the adapter 10 are released from the slots 116 defined on the housing 106 of the connector 100, as is known in the art.

As discussed previously, the illustrated embodiment shows an SC-type fiber optic adapter 10 for receiving SC-type fiber optic connectors 100. It is anticipated that the inventive features of the present disclosure can be utilized with other types, sizes and designs of adapters and connectors.

Although in the foregoing description of the fiber optic adapter 10, terms such as "top", "bottom", "upper", "lower", "front", "back", "right", and "left" were used for ease of description and illustration, no restriction is intended by such use of the terms. The fiber optic adapter 10 can be used in any orientation.

Having described the preferred aspects and embodiments of the present disclosure, modifications and equivalents of the disclosed concepts may readily occur to one skilled in the art. However, it is intended that such modifications and equivalents be included within the scope of the claims which are appended hereto.

What is claimed is:

1. A fiber optic adapter for interconnecting two fiber optic connectors in coaxial alignment, each connector including a generally cylindrical ferrule holding an end of an optical fiber, wherein the adapter defines a body that is configured for mating the two fiber optic connectors in coaxial alignment, wherein the body of the fiber optic adapter includes a main body portion with an axial cavity extending between a first opening defined at a first end of the main body portion and a second opening defined at a second end of the main body portion, the first end configured to receive a first fiber optic connector through the first opening and the second end configured to receive a second fiber optic connector through the second opening for mating with the first fiber optic connector;

the adapter further including a ferrule alignment structure located within the axial cavity, the ferrule alignment structure including a sleeve mount defining a first end, a second end, and a center portion, wherein the first end of the sleeve mount is positioned toward the first end of the main body portion and the second end of the sleeve mount is positioned toward the second end of the main body portion;

the sleeve mount further defining an axial bore that defines a longitudinal axis extending from the first end of the sleeve mount toward the second end of the sleeve mount, the axial bore configured to receive and coaxially align the ferrules of the first and second fiber optic connectors when the connectors are inserted into the adapter, wherein the entirety of the sleeve mount and a majority of the physical parts making up the body of the fiber optic adapter that includes the main body portion are unitarily molded as a single piece, wherein the sleeve mount includes a first portion extending from the center portion of the sleeve mount toward the first end of the sleeve mount and a second portion extending from the center portion of the sleeve mount toward the second end of the sleeve mount, wherein at least one of the first portion and the second portion of the sleeve mount defines an end with an inwardly extending portion for capturing a ferrule-alignment sleeve within the axial bore once the ferrule-alignment sleeve is received within the bore.

2. A fiber optic adapter according to claim 1, wherein each of the first and second portions of the sleeve mount defines an end with an inwardly extending portion for capturing the ferrule-alignment sleeve within the axial bore once the ferrule-alignment sleeve is received within the bore.

3. A fiber optic adapter according to claim 2, wherein the inwardly extending portion of the first portion is defined by an inwardly extending finger of the first portion that is positioned around the axial bore at a peripherally offset relationship along the longitudinal axis defined by the axial bore with respect to an inwardly extending finger of the second portion that defines the inwardly extending portion of the second portion.

4. A fiber optic adapter according to claim 3, wherein each of the first and second portions of the sleeve mount includes three inwardly extending fingers.

5. A fiber optic adapter according to claim 1, wherein at least one of the first portion and the second portion of the sleeve mount defines flexible arms around the axial bore of the sleeve mount for receiving the ferrule-alignment sleeve, the flexible arms configured to flex out radially when receiving the ferrule-alignment sleeve into the axial bore.

6. A fiber optic adapter according to claim 5, wherein the sleeve mount includes at least three of the flexible arms on at least one of the first portion and the second portion of the sleeve mount.

7. A fiber optic adapter according to claim 6, wherein the sleeve mount includes at least three of the flexible arms on each of the first portion and the second portion of the sleeve mount.

8. A fiber optic adapter according to claim 1, wherein the majority of the physical parts making up the body of the fiber optic adapter that includes the main body portion and the entirety of the sleeve mount are unitarily molded out of a polymer.

9. A fiber optic adapter according to claim 1, wherein the axial cavity is defined by a top side wall, a bottom side wall, a right side wall, and a left side wall of the main body portion of the adapter, wherein the fiber optic adapter includes a mounting feature on at least one of the top side wall, the bottom side wall, the right side wall, and the left side wall.

10. A fiber optic adapter according to claim 9, wherein the mounting feature is provided in the form of an outwardly protruding mounting tab unitarily molded with at least one of the top side wall, the bottom side wall, the right side wall, and the left side wall.

11. A fiber optic adapter according to claim 1, wherein the fiber optic adapter is configured for interconnecting two SC-type fiber connectors in coaxial alignment.

12. A fiber optic adapter according to claim 1, wherein the sleeve mount includes two latching hooks extending from the center portion of the sleeve mount toward the first end of the main body portion of the adapter body and two latching hooks extending from the center portion of the sleeve mount toward the second end of the main body portion of the adapter body, wherein the latching hooks extending toward the first end of the main body portion are positioned on opposite sides of the axial bore and are configured to flex toward and away from each other to releasably latch the first fiber optic connector to the adapter, and the latching hooks extending toward the second end of the main body portion are positioned on opposite sides of the axial bore and are configured to flex toward and away from each other to releasably latch the second fiber optic connector to the adapter.

13. A fiber optic adapter according to claim 1, wherein at least one of the first portion and the second portion of the sleeve mount is configured to flex out radially when receiving the ferrule-alignment sleeve into the axial bore from a respective end of the sleeve mount.

14. A fiber optic adapter according to claim 13, wherein both of the first and second portions of the sleeve mount are configured to flex out radially when receiving the ferrule-alignment sleeve into the axial bore from a respective end of the sleeve mount.

15. A method of manufacturing a fiber optic adapter for interconnecting two fiber optic connectors in coaxial alignment, each connector including a generally cylindrical ferrule holding an end of an optical fiber, wherein the adapter defines a body that is configured for mating the two fiber optic connectors in coaxial alignment, wherein the body of the fiber optic adapter includes a main body portion with an axial cavity defined by a top side wall, a bottom side wall, a right side wall, and a left side wall, the axial cavity extending between a first opening defined at a first end of the main body portion and a second opening defined at a second end of the main body portion, the first end configured to receive a first fiber optic connector through the first opening, and the second end configured to receive a second fiber optic connector through the second opening for mating with the first fiber optic connector, wherein the adapter also includes a ferrule alignment structure including a sleeve mount for receiving a ferrule-alignment sleeve, the sleeve mount defining a first end, a second end, and a center portion, wherein the first end of the sleeve mount is positioned toward the first end of the main body portion and the second end of the sleeve mount is positioned toward the second end of the main body portion, the sleeve mount defining an axial bore that defines a longitudinal axis extending from the first end of the sleeve mount toward the second end of the sleeve mount, the axial bore configured to receive and coaxially align the ferrules of the fiber optic connectors when the fiber optic connectors are inserted into the adapter, wherein the sleeve mount includes a first portion extending from the center portion of the sleeve mount toward the first end of the sleeve mount and a second portion extending from the center portion of the sleeve mount toward the second end of the sleeve mount, wherein at least one of the first portion and the second portion of the sleeve mount defines an end with an inwardly extending portion for capturing the ferrule-alignment sleeve within the axial bore once the sleeve is received within the bore, the method comprising:

molding a majority of the physical parts making up the body of the fiber optic adapter that includes the main body portion and the entirety of the sleeve mount as a unitary structure.

16. A method according to claim 15, further comprising using a molding tool for molding the body of the fiber optic adapter that includes the main body portion and the sleeve mount of the fiber optic adapter such that parts of the molding tool are pulled apart from the first and second ends of the main body portion along a direction of the longitudinal axis.

17. A method according to claim 15, further comprising inserting the ferrule-alignment sleeve into the axial bore of the sleeve mount from one of the first end and the second end of the sleeve mount.

18. A method according to claim 17, wherein the ferrule-alignment sleeve is inserted within the axial bore after the majority of the physical parts making up the body of the fiber optic adapter that includes the main body portion and the entirety of the sleeve mount have been unitarily molded.

19. A method according to claim 15, further comprising molding the sleeve mount such that at least one of the first portion and the second portion of the sleeve mount defines flexible arms defined around the axial bore of the sleeve mount for receiving the ferrule-alignment sleeve, the flexible arms configured to flex out radially to receive the ferrule-alignment sleeve into the axial bore after the sleeve mount and the body of the fiber optic adapter that includes the main body portion have been unitarily molded.

20. A method according to claim 19, wherein the sleeve mount includes at least three flexible arms.

21. A method according to claim 15, wherein the majority of the physical parts making up the body of the fiber optic adapter that includes the main body portion and the entirety of the sleeve mount are unitarily molded out of a polymer.

22. A method according to claim 15, wherein the adapter includes a mounting feature on at least one of the top side wall, the bottom side wall, the right side wall, and the left side wall.

23. A method according to claim 22, wherein the mounting feature is provided in the form of an outwardly protruding mounting tab unitarily molded with at least one of the top side wall, the bottom side wall, the right side wall, and the left side wall.

24. A method according to claim 15, further comprising molding the sleeve mount such that each of the first and second portions of the sleeve mount defines an end with an inwardly extending portion for capturing the ferrule-alignment sleeve within the axial bore once the ferrule-alignment sleeve is received within the bore.

25. A method according to claim 24, further comprising molding the sleeve mount such that the inwardly extending portion of the first portion is defined by an inwardly extending finger of the first portion that is positioned around the axial bore at a peripherally offset relationship along the longitudinal axis defined by the axial bore with respect to an inwardly extending finger of the second portion that defines the inwardly extending portion of the second portion.

26. A method according to claim 25, further comprising molding three inwardly extending fingers for each of the first portion and the second portion.

27. A method according to claim 15, wherein the manufactured fiber optic adapter is configured for interconnecting two SC type fiber connectors in coaxial alignment.

* * * * *